UNITED STATES PATENT OFFICE.

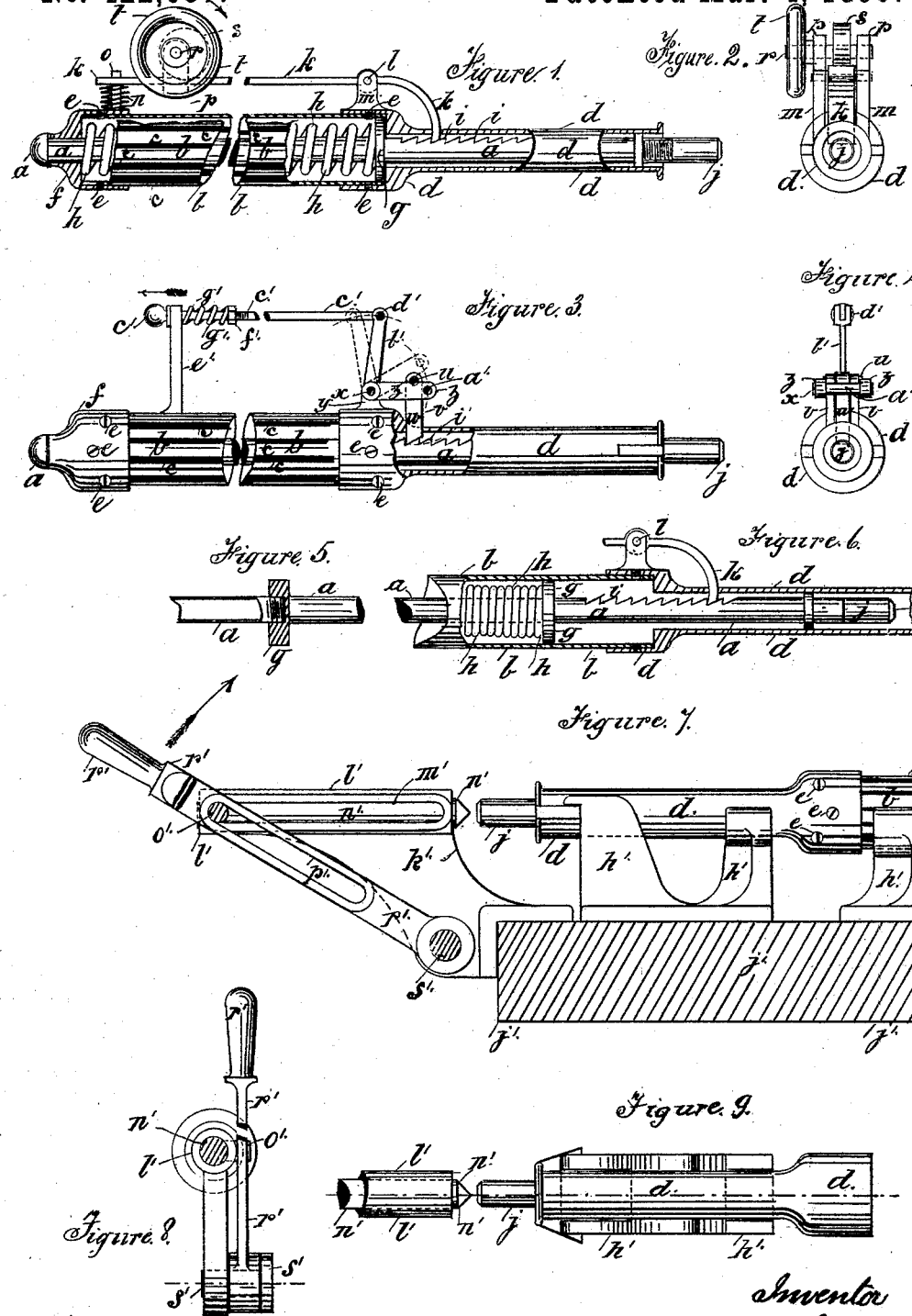

JOHN APSLEY, OF ROCHDALE, ENGLAND, ASSIGNOR OF ONE-HALF TO CHARLES HEAP, OF SAME PLACE.

INSTRUMENT FOR SLAUGHTERING CATTLE.

SPECIFICATION forming part of Letters Patent No. 422,687, dated March 4, 1890.

Application filed May 25, 1889. Serial No. 312,127. (No model.) Patented in England August 2, 1888, No. 11,179.

*To all whom it may concern:*

Be it known that I, JOHN APSLEY, a subject of the Queen of Great Britain, residing at Rochdale, England, have invented a new and useful Instrument for Slaughtering Cattle, (for which I have obtained a patent in Great Britain, No 11,179, bearing date August 2, 1888;) and I do hereby declare that the following is a full, clear, and exact description thereof.

My invention relates to an instrument for slaughtering cattle.

It is well known that the ordinary method of slaughtering cattle by means of the pole-ax is often the cause of much cruelty and suffering to animals. With the use of my instrument an animal may be instantly slaughtered, obviating any abortive or misdirected blows against the head of the animal, as the striking part of the instrument is adapted to be propelled by the aid of force conserved or stored in a coiled spring when the striking end of the instrument is placed upon the head of the animal to be slaughtered. The striking-rod may be instantly released from a position or condition of restraint and propelled forward with great violence.

I accomplish the object hereinbefore stated by the mechanism and arrangement illustrated in the accompanying drawings, in which—

Figure 1 represents an elevation of my instrument, part in section. Fig. 2 represents an end view of Fig. 1. Fig. 3 represents an elevation showing a modification of releasing gear or mechanism. Fig. 4 represents an end view of Fig. 3. Fig. 5 represents a view of the striking-rod made in two parts. Fig. 6 represents a view of the position and condition of the striking-rod and propelling-spring when the rod is placed in position ready for use. Fig. 7 is an elevation of apparatus for placing the striking-rod in position when required for use. Fig. 8 is an end view of Fig. 7. Fig. 9 is a plan of Fig. 7.

I provide a rod $a$, of steel or other suitable metal, which I term the "striking-rod," within a cylindrical casing or tube $b$, which tube is provided lengthwise with a number of openings $c$, and which tube $b$ has attached at one extremity a second tube $d$, being of less internal diameter and being secured thereto by means of set-screws $e$. If necessary, the parts $b$ and $d$ may be in one piece; but I preferably desire to employ two pieces, as shown in the drawings herewith. I interpose between the piece $f$, closing the end of the tube $b$ and the collar or concentric rim $g$ on the rod $a$, a spiral or coil steel spring $h$. If desired, the portion of the rod encompassed or encircled by the spring $h$ may be hollow, (see Fig. 5,) having a screw-thread at one extremity and screwed into the collar $g$. The portion of the rod located in the tube $d$ is provided at its upper part with saw-like teeth $i$, and its extremity being hollow for a suitable distance is provided in the interior with a screw-thread, into which is screwed an edged or sharp tool $j$, formed after the manner of an ordinary slaughtering implement at the point which is adapted to enter the head of the animal. The teeth $i$ are caused (when the end of the rod is pressed or forced within the tube $d$ by an apparatus which I purpose to hereinafter describe, and which is shown in Fig. 7) to pass under the point or end of a suitable lever $k$, the said lever being supported on a stud $l$, carried by brackets $m\ m$. Near or at the other extremity of the lever, between the casing and its under side, I interpose a spiral spring $n$, encircling a fixed stud $o$, which passes through an aperture in the lever, the object of the spring $n$ being to depress the other end of the lever, thus insuring an engagement of the lever at that part with the teeth $i$ on the rod $a$. In proximity to the spring the lever passes between supports $p\ p$. Between said supports, and carried on a stud $r$, is provided a cam $s$, and on one extremity of the stud $r$ is fixed a hand-wheel $t$. The cam $s$ is placed in such a position with relation to the lever $k$ that when the wheel $t$ is partly turned on its axis in the direction of the arrow the lever at that part becomes depressed, its other end raised. Thus (when the instrument is loaded for action) the rod $a$, which may be engaged with the point of the lever, may be released and propelled forward or out of the tube $d$ with more or less force, accordingly as the tool on the rod $a$ may be adjusted a greater or less distance within the tube, or obviously as the spiral spring $h$ becomes more or less compressed within the tube $b$ between the points of compression—that is, between the concentric rim $g$ and the piece $f$, closing end of tube.

I will now proceed to describe, with the aid of Figs. 3 and 4, a modification of releasing or disengaging mechanism. On a stud $u$, carried by supports $v\ v$, I provide a catch or pawl $w$, which is allowed to swing freely thereon. On a stud $x$, carried by supports $y\ y$, are attached the extremities of levers $z\ z$, one being on each end of the stud $x$. I interpose between the levers $z\ z$ at their opposite ends—that is, the ends opposite their fixed ends—a stud $a'$. The stud $x$ between the supports also carries a lever $b'$, (the stud $x$ being free to turn in its supports $y\ y$,) its other end being connected to one extremity of a rod $c'$ by means of a stud $d'$, the other end of the rod $c'$ being supported by a bracket $e'$ between the surfaces of the bracket, and a collar or rim $f'$, provided on the rod $c'$, is provided with a spiral spring $g'$, the object and purpose of the spring $g'$ being to maintain the levers $b'$ $z$ in position so as to insure the catch or pawl $w$ being kept in contact with the teeth $i$ on the rod $a$. Thus the rod $a$ may be retained in position when the same has been forced into the tube $d$. When the rod $a$ is held in such position, and the instrument is required to be used, the rod $c'$ is operated or pulled in the direction of the arrow. The stud $a'$ may be thus raised to the position as indicated by the dotted lines. Then the tool or end of the rod is free to pass out of the tube $d$, the pawl $w$ obviously upon such an occurrence not obstructing the passage of or retaining the rod.

I will now describe with the aid of Figs. 7, 8, and 9 the apparatus for loading my instrument or adjusting the tool within the tube. I provide supports $h'\ h'$, which may be secured to an ordinary bench $j'$, upon which supports the instrument to be loaded may be placed opposite to and in a central position with relation to the stand $k'$. I employ a bracket or carrier $l'$, having a slot $m'$, which is provided with a spindle or center stud $n'$, which spindle is free to slide within the carrier $l'$, and provided at its extremity with some suitable material—such as wood, leather, &c.—which I provide in order that the tool may not be injured. The spindle is provided with a projecting stud $o'$, which enters into a slot $p'$ of a lever $r'$, the said lever being fixed at its lower end on the fixed stud $s'$.

The operation of loading or adjusting within the tube $d$ is as follows: The lever $r'$ being moved or operated in the direction of the arrow, the point of the spindle engages with the tool on the rod, the tool being thus forced within the tube. Consequently the spring $h$ becomes compressed between its extremities. (See Fig. 6.) The lever $k$ or the pawl $w$, as the case may be, engaging with the teeth $i$, the rod is thus held; or the tool may be adjusted to or at any desired position within the tube in order to prepare my instrument for action.

Having now described my invention, what I now desire to claim as new and useful, and to secure by Letters Patent, is—

1. In a slaughtering-instrument, the combination of a cylindrical casing, the serrated longitudinally-movable rod supported in said casing, the sharp-pointed tool carried by said rod and adapted to project from one end of the casing, a spiral spring inclosed in the casing and engaged with said rod, a catch to engage the serrated portion of the rod and hold it in a retracted position, and means for releasing said catch, substantially as described.

2. In a slaughtering-instrument, the combination of a cylindrical casing comprising the pieces $b$, $d$, and $f$, the longitudinally-movable rod $a$, supported in said casing, the tool $j$, carried by said rod, the spiral spring $h$, surrounding and engaged with the rod, the catch-lever $k$, spring $n$, cam $s$, and wheel $t$, substantially as described.

3. The herein-described loading device for a slaughtering-instrument having a spring-actuated tool-carrying rod, said loading device consisting of a support for the slaughtering-instrument, a longitudinally-slotted bracket $l'$, the longitudinally-movable spindle $n'$, supported in said bracket and provided with a stud $o'$, projecting through the slot $m'$ in the side of the bracket, and the lever $r'$, having a slot $p'$ engaged with said stud to actuate the spindle and force the tool-carrying rod within its casing, substantially as described.

JOHN APSLEY.

Witnesses:
JOHN H. BUTTERWORTH,
DANIEL H. DALTON.